Patented Nov. 6, 1934

1,979,442

UNITED STATES PATENT OFFICE 1,979,442

REMOVAL OF RESIDUAL DEBISMUTHIZING REAGENTS IN LEAD REFINING

Jesse O. Betterton and Yurii E. Lebedeff, Metuchen, N. J., assignors to American Smelting and Refining Company, New York, N. Y., a corporation of New Jersey No Drawing. Application August 6, 1932, Serial No. 627,805

9 Claims. (Cl. 75—15)

This invention relates to the refining of lead and particularly concerns the removal of residual reagents from lead which has been debismuthized by means of one or more members of the group comprising alkaline earth metals, lithium and magnesium.

In the removal of bismuth from lead by the use of alkaline earth metals, which for purposes of the present specification and appended claims will be defined as including lithium and magnesium, small amounts of these debismuthizing reagents remain in the lead after the bismuth is substantially eliminated. As the market is steadily demanding that refined lead be substantially free from these residual reagents, the permissible limit often being restricted to percentages no higher than 0.0001%, the problem of economically effecting such removal has become extremely acute.

Our invention provides a method by which residual alkaline earth metal reagents present in debismuthized lead are substantially eliminated from the refined product. Further, our process accomplishes the removal of these residual reagents without the formation of large quantities of dross which are inevitably formed in practicing the processes usually employed in removing these reagents. This is of major importance from a commercial standpoint as the treatment of large quantities of dross is expensive at best and in many cases is prohibitive. Again, our invention is positive and eliminates the uncertain and erratic results attending the usual practices.

By our invention lead which has been debismuthized by alkaline earth metal reagents and contaminated with small amounts of these metals is treated with caustic soda and nitre in such manner that the refined lead is rendered free of these residual debismuthizing reagents.

In a specific case, 100 tons of lead, debismuthized in the usual manner by means of calcium and magnesium and analyzing .027% calcium and .034% magnesium, was heated to a temperature of 760° F. and 75 lbs. of caustic soda and 30 lbs. of nitre added to the molten metal. This was thoroughly incorporated in the bath by stirring with an ordinary lead mixing machine for 1½ hours, at which time the dross formed during the operation was skimmed from the bath. A second addition of 75 lbs. caustic soda and 30 lbs. nitre was then made to the bath and the stirring continued for another 1½ hours at a temperature of approximately 790° F. after which the resulting dross was removed. Following this, a third and final addition of 75 lbs. caustic soda and 30 lbs. nitre was made and the bath stirred for 2 hours at a temperature of approximately 850° F. and the final dross removed.

Following the removal of the final dross, a representative 800 gram sample of the refined lead was found to be entirely free from calcium and magnesium when a method of analysis which would show the presence of these elements in amounts as small as .000025% was employed. At the same time, the weight of the total amount of dross, namely 2825 lbs., was very small in comparison to the 100 tons of lead treated.

While the above example is given by way of illustration, various modifications will be obvious to those skilled in the art. For example, the temperatures may be varied within reasonable limits, say, from 650° F. to 1000° F. or slightly higher, and the stirring or mixing periods may be increased or diminished within limits. Again, the number of additions of the caustic soda-nitre reagent as well as the quantities thereof may be varied with respect to such factors as stirring periods, temperature of the bath and amount of residual debismuthizing reagents present in the lead subjected to treatment according to the invention.

While the amount of caustic soda and nitre used is dependent to a large degree upon the several factors already mentioned and the many permissible variations to which they are susceptible, present indications are that other factors of an economic nature will aid in dictating the proportion of caustic soda to nitre to be used. Generally speaking, we obtain better results when the amount of caustic soda exceeds the amount of nitre employed and, while the proportion may be greatly varied, we find that a caustic soda nitre ratio of approximately 2½:1 gives excellent results and enables us to economically remove all of the residual debismuthizing reagents, although it is still possible to effectively remove the residual alkaline earth reagents when the amount of caustic soda is materially decreased and the amount of nitre increased. However, there is a factor other than the respective costs of the materials which makes it desirable to maintain at least a fair proportion of caustic to nitre and that is the marked increase in the production of dross when too little caustic is used.

It will be readily appreciated that the present invention possesses decided advantages over prior art practices in removing residual reagents from lead debismuthized by the use of alkaline earth metal reagents. For example, it has been common practice to remove the residual reagents by oxidation methods employing air or steam or both. The trouble with such methods, however, is that in attempting to refine lead to meet a specification of, say, .0001% of residual reagents or less, the oxidation method gives imperfect results and, insofar as it does tend to approach the desired result, it does so by the production of large quantities of oxide dross which contains metallic lead in appreciable quantities.

Difficulties similar to those accompanying the oxidation process attend the practice of removing such reagents by subjecting the molten lead to treatment with chlorine gas. While this method is superior to the oxidation method in many ways, the removal of the contaminating debismuthizing reagents to the low limits demanded by the market is uncertain and often imperfect. These disadvantages and limitations of the known oxidation and chloridization methods are all eliminated by the present invention which completely eliminates the residual reagents remaining in the lead after the debismuthizing process with the production of a minimum of dross.

While certain novel features of the invention have been disclosed and are pointed out in the annexed claims, it will be understood that various omissions, substitutions and changes may be made by those skilled in the art without departing from the spirit of the invention.

What is claimed is:

1. The process of treating lead contaminated with small amounts of alkaline earth metal reagents which consists in adding caustic soda and nitre to a molten bath of such lead while maintaining same within a temperature range of 760° F. to 850° F. thereby forming a dross containing the residual alkaline earth metal reagents and effecting a separation between the molten bath and said dross.

2. The process of eliminating residual reagents from lead debismuthized by alkaline earth metal reagents which consists in adding caustic soda and nitre to a molten bath of such lead and thoroughly incorporating the same therein thereby concentrating the alkaline earth metal in a dross.

3. In the removal of residual alkaline earth metal reagents from lead which has been treated with such reagents for the removal of bismuth, the improvement which consists in subjecting a molten bath of such lead to the action of relatively small quantities of caustic soda and nitre for a period of time sufficient to effect the concentration of such residual reagents in a dross upon the surface of said bath.

4. The process of treating lead contaminated with small quantities of alkaline earth metal reagents which consists in adding caustic soda and nitre to a molten bath of such lead at a temperature of approximately 760° F., repeating the treatment at approximately 790° F. and, again, at approximately 850° F. whereby the lead is entirely free from alkaline earth metal reagents.

5. In the removal of residual alkaline earth metal reagents from a molten bath of lead containing such reagents in limited amounts, the improvement which consists in repeatedly incorporating small amounts of caustic soda and nitre in such molten bath and successively skimming the resulting drosses therefrom.

6. In the removal of residual alkaline earth metal reagents from a molten bath of lead containing such reagents in limited amounts, the improvement which consists in repeatedly incorporating small amounts of caustic soda and nitre in such molten bath within a temperature range of 760° F. to 850° F. and removing the resulting dross from the bath after each addition of caustic soda and nitre.

7. The method of removing small amounts of alkaline earth metal reagents from lead which consists in concentrating the alkaline earth metal reagents in a dross of limited and restricted volume by thoroughly incorporating small amounts of caustic soda and nitre in a molten bath of such lead within a temperature range of 760° F. to 850° F.

8. The method of reducing the alkaline earth metal content of lead to 0.0001% or less which consists in making successive additions of caustic soda and nitre to a molten bath of such lead, thoroughly agitating the bath after each addition of such reagents thereby concentrating the alkaline earth metals in a dross upon the surface of said bath and removing the dross prior to each addition of caustic soda and nitre.

9. The method of reducing the alkaline earth metal content of lead to 0.0001% or less which consists in adding caustic soda and nitre to a molten bath of lead contaminated with small amounts of alkaline earth metals, thoroughly agitating the bath thereby concentrating the alkaline earth metals in a dross upon the surface of said bath and effecting a separation between said dross and purified lead.

JESSE O. BETTERTON.
YURII E. LEBEDEFF.